United States Patent
Duffy et al.

(10) Patent No.: US 7,219,649 B2
(45) Date of Patent: May 22, 2007

(54) ENGINE SYSTEM AND METHOD OF OPERATING SAME OVER MULTIPLE ENGINE LOAD RANGES

(75) Inventors: Kevin P. Duffy, Metamora, IL (US); Roger L. Urven, Jr., Colona, IL (US); Cory A. Brown, Pekin, IL (US); Mary L. Kesse, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/201,238

(22) Filed: Aug. 10, 2005

(65) Prior Publication Data

US 2007/0034188 A1 Feb. 15, 2007

(51) Int. Cl.
*F02M 57/00* (2006.01)
*F02M 57/02* (2006.01)
(52) U.S. Cl. ..................... 123/299; 123/305
(58) Field of Classification Search ............... 123/299, 123/300, 305, 295, 446
See application file for complete search history.

(56) References Cited

U.S. PATENT DOCUMENTS

| | | | |
|---|---|---|---|
| 5,458,292 A | 10/1995 | Hapeman | |
| 6,182,632 B1 | 2/2001 | Yanagihara | |
| 6,230,683 B1 | 5/2001 | Zur Loye et al. | |
| 6,516,774 B2 | 2/2003 | Zur Loye et al. | |
| 6,561,157 B2 | 5/2003 | Zur Loye et al. | |
| 6,623,401 B2 * | 9/2003 | Idogawa et al. | 477/54 |
| 6,659,071 B2 | 12/2003 | LaPointe et al. | |
| 6,684,852 B2 | 2/2004 | Wright et al. | |
| 6,725,838 B2 | 4/2004 | Shafer et al. | |
| 6,978,760 B2 * | 12/2005 | Stewart et al. | 123/299 |
| 6,978,771 B2 * | 12/2005 | Kuzuyama et al. | 123/568.11 |
| 7,021,276 B2 * | 4/2006 | Liu et al. | 123/299 |

(Continued)

FOREIGN PATENT DOCUMENTS

EP 1 348 857 A2 10/2003

(Continued)

OTHER PUBLICATIONS

G Nagarajan, A N Rao, T R Jagadeesan and S Renganarayanan, Institute for Energy Studies, Anna University—Chennai, Review of Ethanol in Compression Ignition Engine,[online],Retrieved from the Internet: <URL:http://www.saeindia.org/saeconference/ethanolreview.htm>.*

*Primary Examiner*—Mahmoud Gimie
(74) *Attorney, Agent, or Firm*—Liell & McNeil (57) ABSTRACT

A method of operating an engine system should produce relatively low concentrations of various emissions without compromising a desired power output of the system. In order to operate an engine system of the present disclosure, a predetermined total amount of fuel injected into at least one combustion chamber is apportioned into at least a first amount and a second amount of fuel. The first amount of fuel is injected into the at least one combustion chamber during non-auto ignition conditions. The second amount of fuel is injected into the at least one combustion chamber during auto-ignition conditions. When the engine system is in a mid-low engine load range, the second amount of fuel is one of equal to or less than 15% of the predetermined total amount of fuel. When the engine system is in a high engine load range, the second amount of fuel is greater than 15% of the predetermined total amount of fuel.

19 Claims, 5 Drawing Sheets

U.S. PATENT DOCUMENTS

| | | | |
|---|---|---|---|
| 7,086,377 B2 * | 8/2006 | Best | 123/299 |
| 2002/0020388 A1 | 2/2002 | Wright et al. | |
| 2003/0066509 A1 | 4/2003 | Shafer et al. | |
| 2004/0055559 A1 * | 3/2004 | Best | 123/276 |

FOREIGN PATENT DOCUMENTS

EP    1 491 740 A1    12/2004

* cited by examiner

ENGINE SYSTEM AND METHOD OF OPERATING SAME OVER MULTIPLE ENGINE LOAD RANGES

STATEMENT OF GOVERNMENT INTEREST

The United States Government has certain rights in the present patent application, and any patent that may issue thereon, under DOE Contract No. FC05-97OR22605.

TECHNICAL FIELD

The present disclosure relates generally to engine systems, and more specifically to operating an engine system to produce low undesirable emissions over multiple engine load ranges.

BACKGROUND

Engineers are constantly seeking new strategies of reducing undesirable emissions, such as NOx and particulate matter including hydrocarbons and soot. One method of reducing emissions is to control the injection strategy of fuel into a combustion chamber. It has been found that varying the timing, the number and fuel amount of the injection(s) can alter the amount of undesirable emissions being produced by combustion.

Although controlling the injection strategy of fuel into the combustion chamber can reduce undesirable emissions, an injection strategy found to reduce concentrations of one undesirable emission may result in a relatively higher concentration of another undesirable emission. For instance, a fuel injection relatively early in a compression stroke, such as 60° before top dead center, may result in low NOx emissions, but may create relatively high hydrocarbon emissions. An injection relatively late in the compression stroke, such as near top dead center, may result in low hydrocarbon emissions, but relatively high NOx emissions.

Similarly, at different engine loads, the engine has different demands and produces varying concentrations of different undesirable emissions. For instance, at low loads, the lesser amount of fuel typically injected into the combustion chamber inherently produces lower hydrocarbon amounts in the engine exhaust. At mid-low engine loads, the injection strategy may be designed to maintain low hydrocarbon emissions. However, as engine load increases, the more the injection strategy must be designed to meet the power demand on the engine. For instance, an injection strategy, such as an early injection, that produces low NOx concentrations at a low engine load may not provide sufficient power output at high engine loads.

Further, the more control over the timing and amount of fuel injections, the greater the ability to reduce undesirable emissions. Because conventional fuel injectors include only one set of nozzle outlets, the injectors can inject fuel in only one spray pattern. Because conventional fuel injectors inject fuel in a spray pattern with a relatively large angle, with respect to a centerline of the combustion chamber, fuel injected when an engine piston is relatively low in the cylinder can make contact with the cylinder walls. This can lead to fuel-to-oil dilution and significant mechanical problems, such as piston seizure due to lubrication losses. Thus, the timing and amount of fuel that can be injected by a conventional fuel injector is limited. U.S. Pat. No. 6,725,838 to Shafer et al. sets forth one example of a fuel injector capable of injecting fuel at both a narrow, or wide spray angle via separate sets of fuel injection orifices. While Shafer et al. discuss various designs and operating strategies, there remains room for improvement.

The present disclosure is directed at overcoming one or more of the problems set forth above.

SUMMARY OF THE DISCLOSURE

In one aspect of the present disclosure, an engine system is operated by apportioning a predetermined total amount of fuel injected into at least one combustion chamber into at least a first amount of fuel and a second amount of fuel. The first amount of fuel is injected into the at least one combustion chamber during non-auto ignition conditions. The second amount of fuel is injected into the combustion chamber during auto-ignition conditions. When the engine system is in a mid-low engine load range, the second amount of fuel is equal to or less than 15% of the predetermined total amount of fuel. When the engine system is in a high engine load range, the second amount of fuel is greater than 15% of the predetermined total amount of fuel.

In another aspect of the present disclosure, an engine system includes at least one piston that is operable to reciprocate within at least one combustion chamber, respectively. A fuel injector is operable to inject fuel into the at least one combustion chamber and is in communication with an electronic control module that includes a mid-low engine load algorithm and a high engine load algorithm. The mid-low engine load algorithm is operable to signal the fuel injector to inject a predetermined total amount of fuel that is divided between a first low NOx emissions injection during non-auto ignition conditions and a second particulate emissions reducing injection during auto ignition conditions. The particulate reducing emissions injection is less than or equal to 15% of the total predetermined amount of fuel. The high engine load algorithm is operable to signal the fuel injector to inject the predetermined total amount of fuel that is divided between a first low NOx emissions injection during non-auto ignition conditions and a second high power-producing injection during auto-ignition conditions. The second high power-producing injection is greater than 15% of the predetermined total amount of fuel.

DETAILED DESCRIPTION

Figure 1:
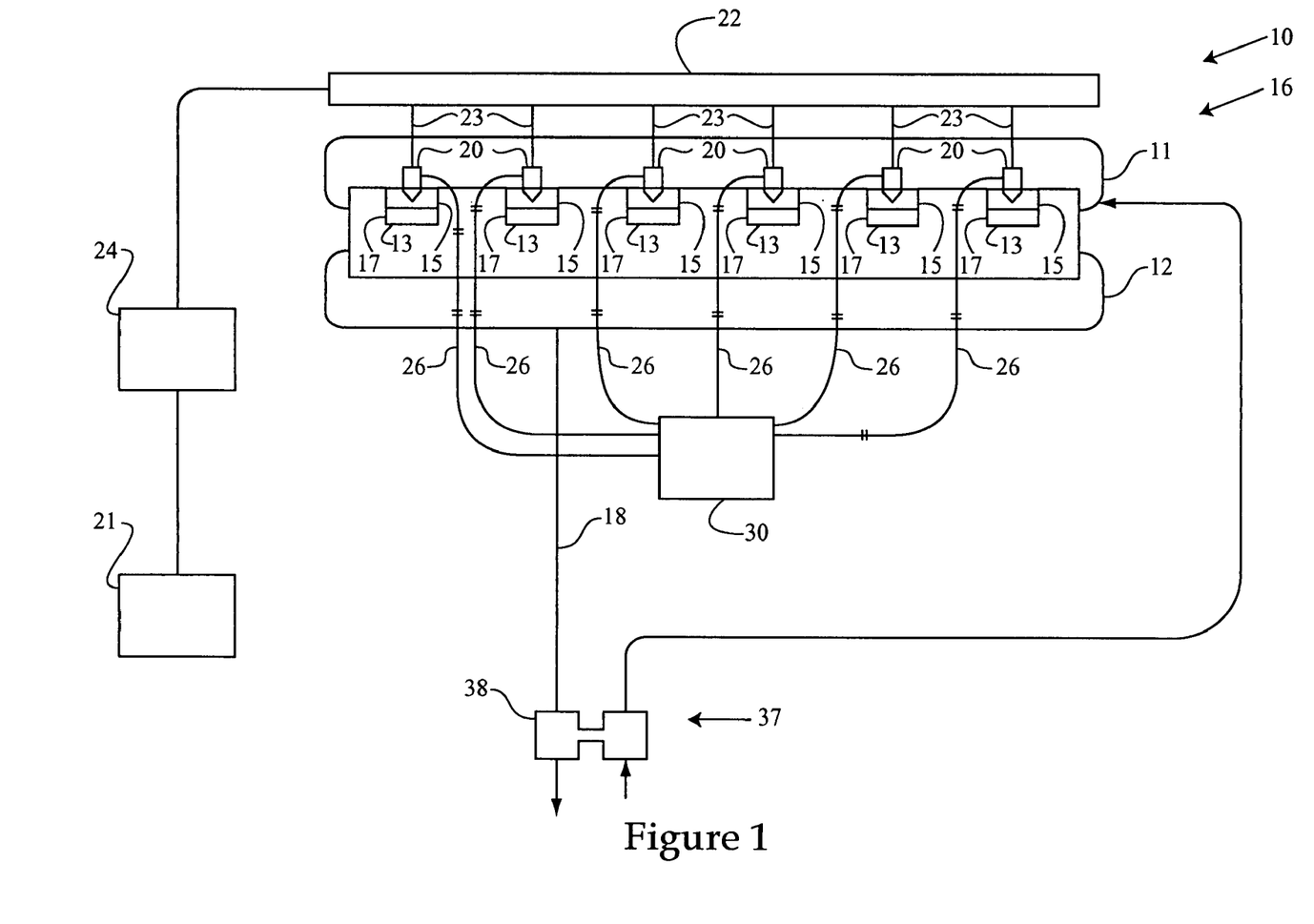
FIG. 1 is a schematic representation of an engine system, according to the present disclosure.

Referring to FIG. 1, there is shown a schematic representation of an engine system 10, according to a first embodiment of the present disclosure. Although the engine system 10 could include more than one engine that may or may not have their power outputs coupled to one another, the engine system 10 is illustrated as including a single internal combustion engine 16. Although the engine could include any number of cylinders, the engine 16 is illustrated as including six cylinders 15, each defining a combustion chamber 17 in which a piston 13 reciprocates between top dead center and bottom dead center. A fuel injector 20 is operable to inject fuel into each combustion chamber 17. Although the present disclosure is illustrated for a four-stroke engine, the present disclosure contemplates use with a two-stroke engine.

Fuel is supplied to the fuel injectors 20 from a fuel tank 21 via at least one conventional fuel pump 24. The fuel pump 24 is fluidly connected to a common rail 22 that is fluidly connected to each fuel injector 20 via individual branch passages 23. The fuel pump 24 is preferably in communication with an electronic control module 30 such that the pressure of the fuel being supplied to the fuel injectors 20 can be controlled. The fuel injectors 20 may be fluidly connected to the fuel tank 21 via a return line 25. The fuel not injected into the combustion chambers 17 can be returned to the fuel tank 21 for re-circulation through the system 10. Because each fuel injector 20 is in communication with the electronic control module 30 via respective injector communication lines 26, the electronic control module 30 can separately control each fuel injector 20.

The combustion chambers 17 are in fluid communication with an air-intake manifold 11 and exhaust manifold 12. Although the engine 16 is illustrated as including only one air-intake manifold 11 and exhaust manifold 12, the present disclosure contemplates the combustion chambers being divided among more than one air-intake manifold and/or exhaust manifold. By including more than one air-intake manifold and/or exhaust manifold, the air-intake into the cylinders can be separately controlled and/or the exhaust can be separately treated for emissions reduction. The exhaust manifold 12 is fluidly connected to an exhaust passage 18. Although not illustrated, it should be appreciated that a variety of catalysts and/or filters may be included in the exhaust passage 18 including, but not limited to, particulate filters, NOx traps, and/or three-way catalysts, etc.

Preferably, the engine 16 includes a forced-induction system 37 to increase power output and/or control the air to fuel-vapor ratios within the combustion chambers 17. In the illustrated embodiment, the forced induction system 37 includes a turbocharger 38 operably connected with the air-intake manifold 11. The turbocharger 38 utilizes the exhaust in the exhaust passage 18 to provide power for a compressor, and this compressor may provide additional air to the second air intake manifold. It should be appreciated that the forced induction system 37 may include superchargers and/or be turned on and off based on demand. For instance, when lower air-intake is needed, the combustion chambers 17 can be naturally aspirated. It should be appreciated that the power output and/or air to fuel-vapor ratio of each combustion chamber could be controlled by other means, including but not limited to, an air-intake throttle valve.

Figure 2:
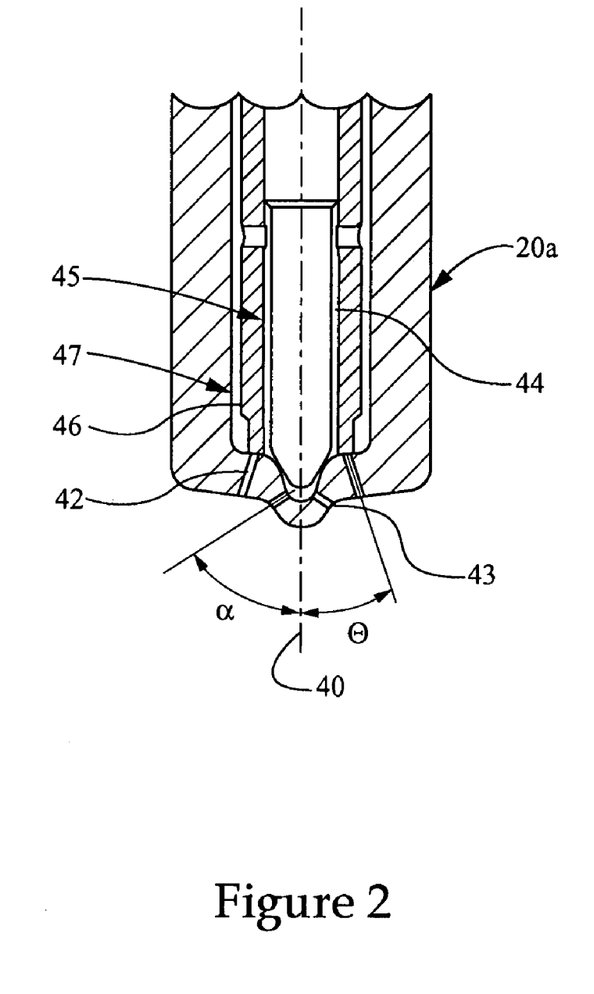
FIG. 2 is an enlarged sectioned side diagrammatic view of a tip portion of a fuel injector within the engine system of FIG. 1.
Figure 4:
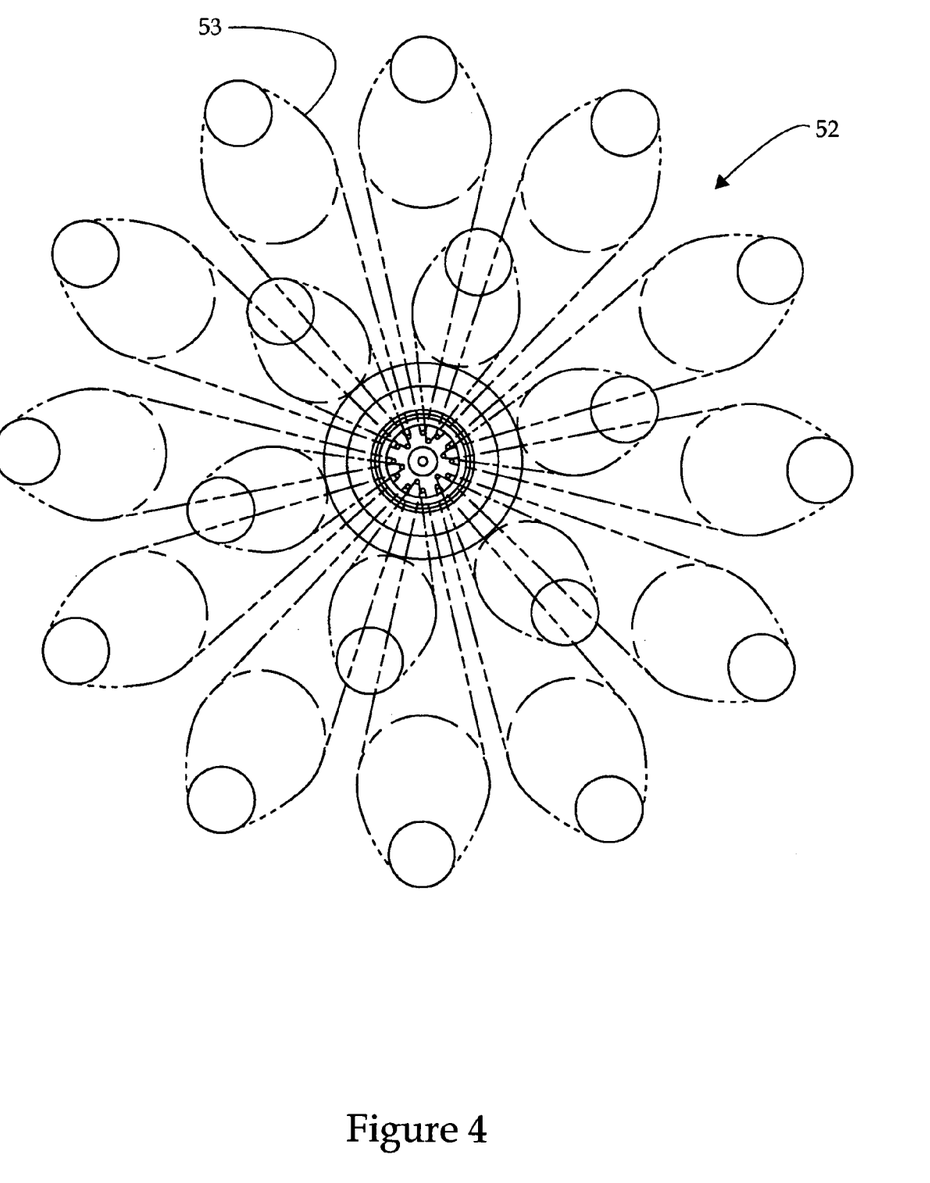
FIG. 4 is a bottom view of a first spray pattern from the fuel injector of FIG. 2.

Referring to FIG. 2, there is shown an enlarged sectioned side diagrammatic view of a tip portion of the fuel injectors 20 within the engine system 10 of FIG. 1. Although any type of conventional fuel injector with only one set of nozzle outlets can be used, the fuel injector 20 may be a mixed-mode fuel injector that is operable to inject fuel in at least a first spray pattern (shown in FIG. 4) through a first nozzle outlet set 42 and a second spray pattern, which may be a conventional well known pattern, through a second nozzle outlet set 43. The first nozzle outlet set 42 is referred to as semi-homogenous or homogenous charge nozzle outlet set and has a relatively small average angle theta with respect to a centerline 40 of the combustion chambers 17. These outlets may be relatively small and arranged in a showerhead pattern as shown in FIG. 4. Thus, the first spray pattern, referred to as a homogeneous charge spray pattern, includes a relatively small average angle theta with respect to the centerline 40 of the combustion chamber 17. The second nozzle outlet set 43 is referred to as conventional nozzle outlet set typical of those in the art and has a relatively large average angle alpha with respect to the centerline 40. These outlets are typically associated with fuel injections in the vicinity of piston top dead center as is known in the art. The second spray pattern, referred to as a conventional spray pattern, includes a relatively large average angle alpha with respect to the centerline 40 of the combustion chamber 17. The opening and closing of the second nozzle outlet set 43 and the first nozzle outlet set 42 may be controlled by an inner needle valve member 44 of a second direct control needle valve 47 and an outer needle valve member 46 of a first direct control needle valve 45, respectively. The fuel injectors 20 have the ability to controllably inject fuel through the first nozzle outlet set 42, the second nozzle outlet set 43, or both.

Figure 3:
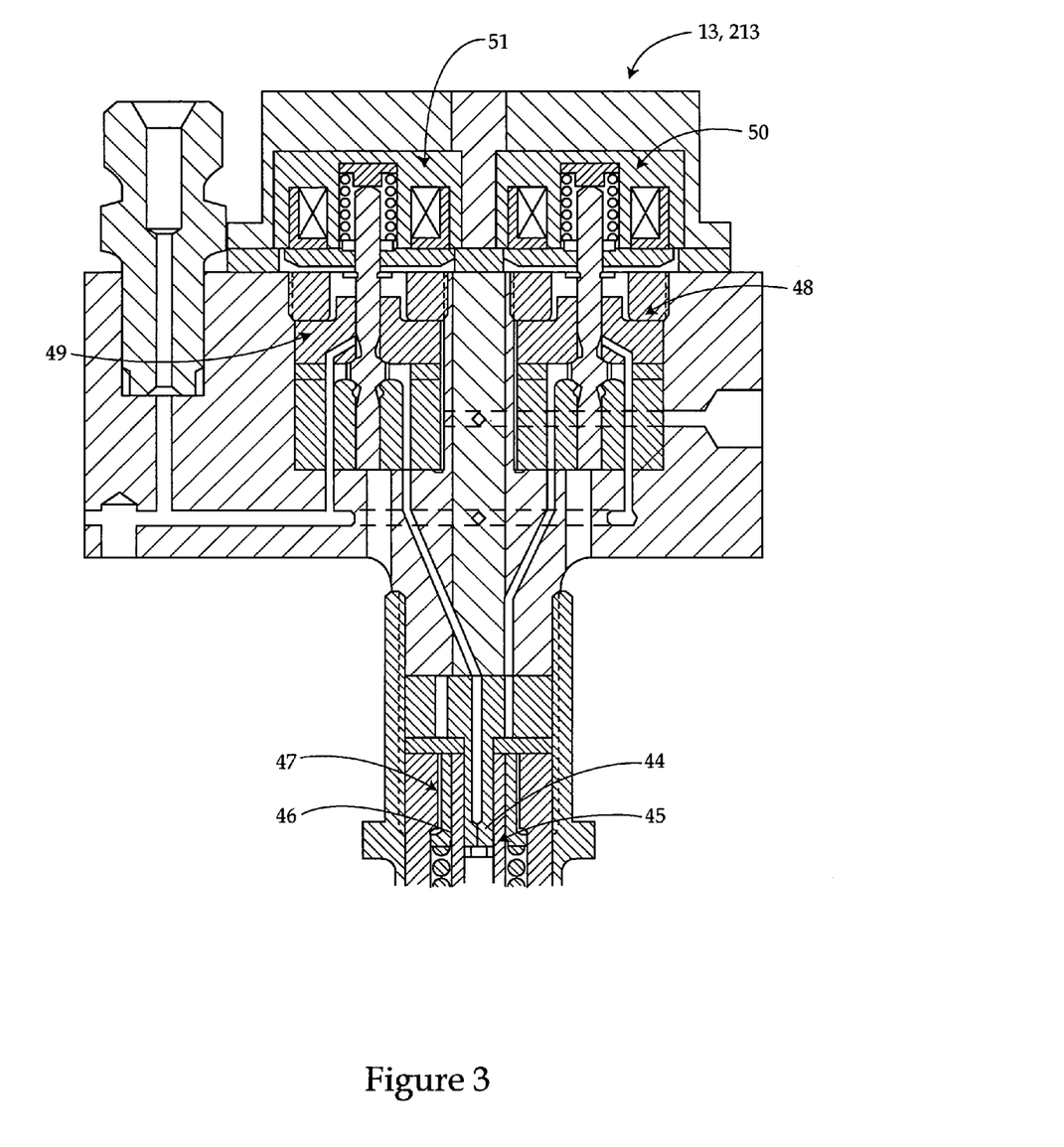
FIG. 3 is a sectioned side diagrammatic view of an upper portion of the fuel injector of FIG. 2.

Referring to FIG. 3, there is shown a sectioned side diagrammatic view of an upper portion of the fuel injectors 20 of FIG. 2. A first and second needle control valves 48 and 49 control the positioning of the first and second direct control needle valves 45 and 47, respectively. Both needle control valves 48 and 49 operate in a similar manner and are preferably three-way valves that are substantially identical in structure. The first and second needle control valves 48 and 49 are operably coupled to a first and second electrical actuators 50 and 51, respectively. In order to open the first nozzle outlet set 42, the first electrical actuator 50 is energized, and the first needle control valve 48 moves to a position that relieves pressure acting on a closing hydraulic surface of the outer needle valve member 46. The outer needle valve member 46 can be lifted off its seat by high-pressure fuel within the injector 20, and the fuel can be injected through the first nozzle outlet set 42. Similarly, in order to open the second nozzle outlet set 43, the second electrical actuator 51 is energized, moving the second needle control valve 49 to a position that relieves pressure acting on a closing hydraulic surface of the inner needle valve member 44. The inner needle valve member 44 can be lifted off its seat by high pressure fuel within the fuel injector 20 and inject the fuel through the second nozzle outlet set 43. Both the first and second electrical actuators 50 and 51 can be activated in various timings, including simultaneously, to inject fuel in different sequences and spray patterns. It should be appreciated that any fuel injector with the ability to inject fuel in more than one spray pattern may be considered a mixed-mode injector for use within the present disclosure regardless of the means for controlling the opening and closing of the different nozzle outlet sets.

Referring to FIG. 4, there is shown an example first spray pattern 52. The first spray pattern 52 is illustrated to include 18 nonintersecting plumes 53 that are directed downward with an average angle theta, as shown in FIG. 2. Average angle theta is preferably substantially small compared to the average angle alpha of the second spray pattern injected through the conventional nozzle outlet set 43. Generally, the engine piston 13 is farther away from top dead center during non-auto ignition conditions than during auto-ignition conditions. Thus, in order to avoid spraying the walls of the cylinder 15 and the piston 13 during non-auto ignition conditions, fuel can be injected in the first spray pattern 52 with the relatively small average angle with respect to the centerline 40 of the combustion chamber 17. If fuel is being injected in a conventional manner in auto-ignition conditions when the piston 13 is nearer to top dead center, fuel can be injected in the conventional second spray pattern with the relatively large average angle with respect to the centerline 40.

Figure 5:
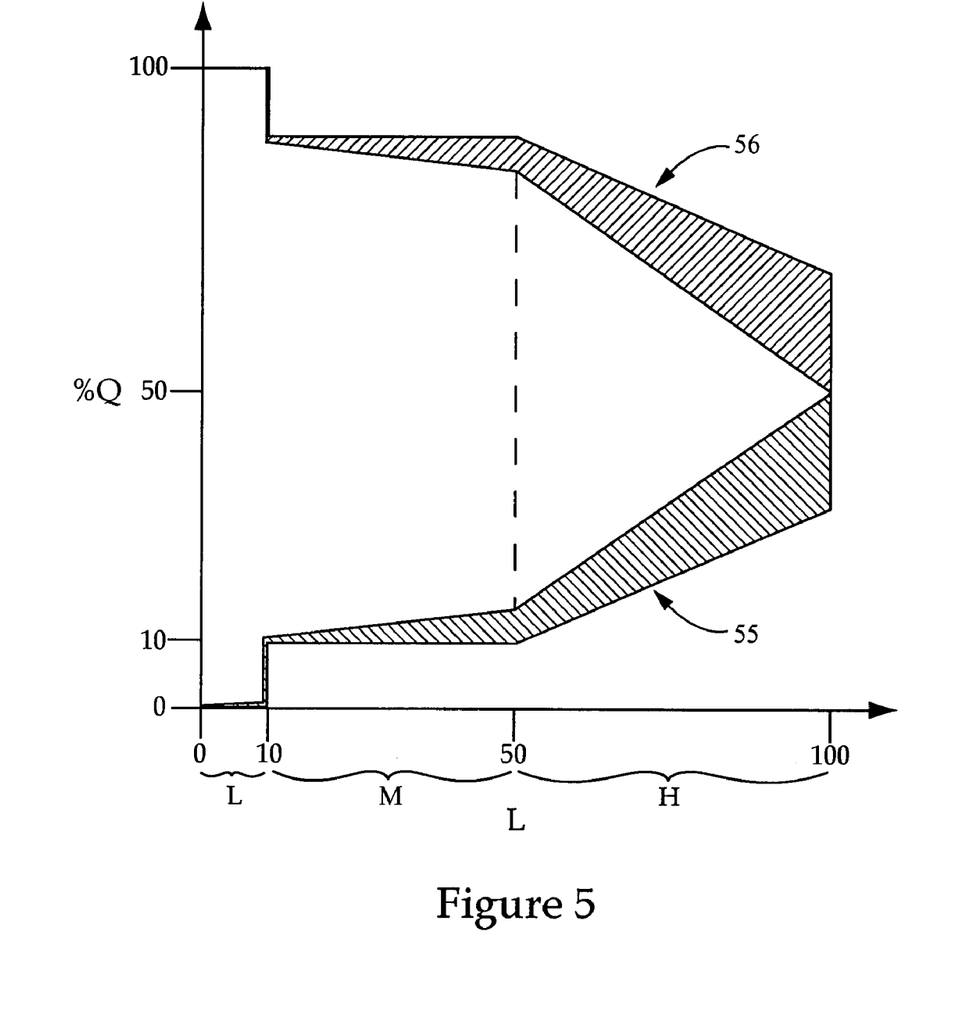
FIG. 5 is a graphical illustration of a low engine load algorithm, a mid-low engine load algorithm and a high engine load algorithm, according to the present disclosure.

Referring to FIG. 5, there is shown a graph illustrating the apportioning of the predetermined total amount of fuel over the entire engine load range, according to the present disclosure. Those skilled in the art will appreciate that engine load is a combination of engine speed and torque. Thus, the engine load range is illustrated as "L" on the x-axis and the percentage of fuel % Q for each of a conventional injection (s) and homogenous charge injection "H" on the y-axis. The electronic control module 30 includes a control algorithm that determines the relative proportions of a total amount of fuel between one or more homogeneous charge injection events 56 during non-auto ignition conditions, and conventional injection event(s) 55 during anto-ignition conditions. In the illustrated embodiment, 100% of the fuel is injected in a homogeneous charge injection(s) 56 when the engine 16 is in a low engine load range "L", being between about 0–10% engine load. In a mid-low engine load range M, being between 11–50% engine load in this example, 85–90% of the total fuel is injected during non-auto ignition conditions 56, and the remaining 10–15% is injected in conventional injection(s) 55. This combination produces low NOx and low particulates. When the engine 16 is in a high engine load range H, being between 51–100% in this example, the graph shows that is might be desirable to gradually increase the percentage of conventional injections 55 from 10–15% over the mid-low speed range, which in this example is from 11–50% of engine load. Those skilled in the art will recognize that at this mid-low engine load range, the resulting engine emissions do not have either the lowest possible NOx concentration nor the lowest possible particulate count; however, the combination shown produces extremely low NOx while also maintaining particulate emissions also extremely low. What this strategy does reflect is a belief that no injection strategy can simultaneously produce the lowest possible NOx and lowest possible particulate emissions. However, it should be appreciated that the division of operating ranges to include low, medium low and high portions can vary from engine to engine. In addition, an engine's total operating range could be broken into more than the low, medium low and high operating ranges reflected in the graph of FIG. 5 without departing from the present disclosure. For instance, an engine without the turbocharger may require the high engine load algorithm to operate below 50% engine load. In this example, the high low range begins at 51% and proceeds to 100%. Over this range, one could expect the total fuel to be injected to be partitioned between homogenous charge injections before auto-ignition and conventional injections after auto-ignitions exist according to the graph. At 100% load, the total amount of fuel could be injected before auto-ignition conditions 56 would be about 50–70% of the total amount of fuel, and consequently the conventional injection 55 at 100% load would be between 30–50% for the conventional injections. This portion of the graph reflects that above a certain threshold, the various engine hardware components might experience too much stress in a relatively large homogeneous charge combustion event, and therefore additional power demands are met by ever increasing amount and percentage of conventional injections to meet the overall power demands on the engine.

During each engine cycle, the fuel injectors 20 will inject a predetermined total amount of fuel. Those skilled in the art will appreciate that, as engine load increases, the predetermined total amount of fuel will also increase. In the low engine load range "L", the electronic control module 30 is programmed to signal the fuel injector 20 to inject the predetermined total amount of fuel in one or more low NOx emissions injection(s) during non-auto ignition conditions. Although the timing of the injection can vary, generally the injection will occur relatively early in the engine cycle, such as at least 40°–60° before top dead center of the compression stroke. Because the low NOx emissions injection occurs when the piston 13 is relatively low in the engine cylinder 15, the predetermined total amount of fuel might preferably be injected through the first nozzle outlet set. Thus, the fuel will be injected in the first spray pattern, being the homogenous charge spray pattern. Because of the relatively small average angle of the first spray pattern with respect to the centerline 40 of the combustion chamber 17, the fuel is sprayed downward into the open space within the combustion chamber 17, thereby avoiding spraying the cylinder walls. As the engine piston 13 advances, the fuel will mix with the air. Eventually, the fuel and air will result in a relatively homogenous combustion that creates low NOx emissions when auto ignition conditions arise in the cylinder. In the event that the fuel injector only has one available spray pattern that is more akin to a conventional injector with a large angle spray pattern, the injection would likely occur closer to the 40° mark before top dead center rather than earlier in the compression cycle in order to lessen the likelihood of wall wetting. The programming associated with the electronic control module 30 when the engine is operating in the low load range, can be thought of as a low NOx algorithm.

When in the mid-low load range "M", a mid-low NOx algorithm 28 is operable to signal the fuel injectors 20 to inject the predetermined total amount of fuel, which is divided between a first low NOx emissions injection during non-auto ignition conditions and a second particulate emissions reducing injection during auto-ignition conditions. The first low NOx emissions injection will be similar to the low NOx emissions injection of the low engine load algorithm previously described. The first low NOx emissions injection occurs during non-auto ignition conditions when the piston 13 is generally relatively far from top dead center. Preferably, the first low NOx emissions injection will be in the first spray pattern 52 in order to avoid fuel spraying the cylinder walls. The mid-low engine load algorithm 28 will apportion 15% or less of the predetermined total amount of fuel to the second particulate emissions reducing injection. In the illustrated example, 10–15% of the predetermined total amount of fuel is apportioned to the second particulate emissions reducing injection. The 10–15% has been found to be sufficient to burn the hydrocarbons created by the first low NOx emissions injection, but low enough to limit the amount of soot and NOx created by the second particulate reducing emissions injection. Because the second particulate emissions injection occurs during auto ignition conditions, the piston 13 is relatively near top dead center of the compression or expansion stroke. Thus, the second particulate emissions injection is preferably injected through the second nozzle outlet set in the second spray pattern with the relatively large average angle with respect to the centerline 40 of the combustion chamber 17. Because the fuel will ignite upon injection, the risk of spraying the cylinder walls and piston 13 is less of a concern and the fuel can be injected in a conventional spray pattern.

The mid-low engine load algorithm may include an emissions adjustment algorithm that is operable to adjust the NOx emissions and particulate emissions by reapportioning the predetermined total amount of fuel between the low NOx emissions injection and the particulate emissions-reducing injection. It should be appreciated that the apportionment of the predetermined total amount of fuel between the first low NOx emissions injection and the particulate emissions-reducing injection can be determined by any conventional open loop or closed loop system. For instance, the electronic control module 30 may include a map with the amount of fuel to be injected in the low NOx emissions injection and the amount of fuel to be injected in the particulate emissions-reducing injection for each engine load within the mid-low engine load range. In the illustrated example, the amount of fuel apportioned to the particulate emissions-reducing injection will vary between 10–15% depending on the engine load. Generally, the greater the engine load, the more fuel apportioned to the second particulate emissions-reducing injection.

In addition to the map, a sensor that can sense the NOx emissions and sensor that can sense the particulate emissions might be positioned within the exhaust passage 18. The mid-low engine load algorithm might adjust the predetermined fuel amounts within the map in order to assure that the sensed NOx concentrations and the sensed particulate concentrations stay below predetermined NOx concentrations and predetermined sensed particulate concentrations. If the sensed particulate concentration is greater than the predetermined particulate concentration, the fuel from the first low NOx injection can be apportioned to the particulate emissions-reducing injection. If the sensed NOx concentration is greater than the predetermined NOx concentration, the fuel from the second particulate emissions-reducing injection can be re-apportioned to the first low NOx emission injection.

The mid-low engine algorithm is operable to signal the fuel injector 20 to inject the particulate emissions-reducing injection at least a predetermined amount of time after combustion of the low NOx emissions injection. The predetermined amount of time is an amount of time sufficient to allow the combustion chamber 17 to cool from the combustion of the low NOx emissions injection. In the illustrated embodiment, with the mixed-mode fuel injector 20, the first low NOx emissions injection might occur at least about 40°–60° before top dead center. Using a conventional fuel injector, the first low NOx injection might occur closer to about 40 degrees before top dead center. Because the conventional fuel injector includes only the conventional nozzle outlet set with the large average angle from the centerline of the combustion chamber, the injection may need to occur later in the engine cycle when the engine piston is closer to top dead center in order to reduce the risk of cylinder wall wetting. Regardless of the fuel injector used, the second particulate-emissions reducing injection will occur in the vicinity of top dead center. This ought to be at least some predetermined amount of time after combustion of the first low NOx emissions injection. It has been found that the longer the time duration between combustion of the first injection and the injection of the second injection, the less NOx produced. But longer delays can reduce the amount of work extracted to the engine from the fuel. The predetermined amount of time may be sufficiently long that the combustion chamber 17 has cooled but not too long that it has returned to non-auto ignition conditions. Thus, the mid-low engine load algorithm preferably also includes a NOx reducing algorithm operable to reduce NOx emissions from the combustion chambers 17 by retarding a timing of the particulate emissions reducing injection. The second particulate-emissions injection can, and most often will, occur after top dead center in the expansion stroke.

In the high load range "H", a high engine load algorithm is operable to signal the fuel injectors 20 to inject the predetermined total amount of fuel, which is divided between a first low NOx emissions injection during non-auto ignition conditions and a second high power-producing injection during auto-ignition conditions. The amount of fuel apportioned to the second high power-producing injection of the high engine load algorithm will generally be greater than 15% of the predetermined total amount of fuel. Similar to the low NOx emissions injections of the low engine load algorithm and the mid-low engine load algorithm, the low NOx emissions injection of high engine load algorithm will occur about 40°–60° before top dead center. If a conventional injector is used, the low NOx emissions injection may occur about 40° before top dead center. Thus, the homogenous combustion of the low NOx emissions injection will produce relatively low NOx emissions. However, due to the sudden pressure increase caused by the combustion of the low NOx injection, only a limited amount of fuel can be included within the low NOx emissions injection. Thus, the low NOx emissions injection can create only a limited amount of power. By allocating more fuel of the predetermined total amount of fuel to the second power-producing injection, the power needed in the high engine load range "H" can be achieved. The second high power-producing injection is injected in the second spray pattern with the relatively large angle respective to the centerline of the combustion chamber 17 in the vicinity of top dead center.

In the illustrated embodiment, the high engine load range "H" includes 51–100% engine load. The amount of fuel apportioned to the second high power-producing injection will increase as the desired engine load increases. At 51%, the amount of fuel apportioned to the power-producing injection may be 15–20%, whereas, at full engine load, the amount of fuel apportioned to the power-producing injection may be as high as 70% or more of the total quantity injected in that engine cycle.

Similar to the mid-low engine load algorithm, the high engine load algorithm is operable to signal the fuel injector to inject the high power-producing injection at least the predetermined amount of time after combustion of the low NOx emission injection. Further, the high engine load algorithm may include a NOx reducing algorithm operable to reduce NOx emissions from the combustion chamber 17 by retarding a timing of the high power-producing injection. Like in the mid-low engine load range "M", in the high engine load range "H", the greater the time duration between the combustion of the first low NOx producing injection and the high power-producing injection, the cooler the combustion chamber 17 and the less NOx produced by the high power-producing injection. Although the high power-producing injection may be retarded until after top dead center in the expansion stroke, it should be appreciated that the more fuel being injected in the second high power-producing injection, the less the timing of the second injection can be retarded. Thus, at the higher engine loads, the second high power-producing injection may occur earlier than in at the more mid-high engine load range "M". Power output from the engine is sacrificed when the power producing injection is retarded. Therefore, a balance between power output efficiency, NOx emissions, soot and other particulate emissions must be arrived at within other constraints, such as a maximum magnitude of a pressure spike from homogenous combustion.

INDUSTRIAL APPLICABILITY

Referring to FIGS. 1–5, a method of operating the engine system 10 over an engine operating range will be discussed. Although the present disclosure will be discussed for one engine 16, it should be appreciated that the present disclosure could apply to operation of an engine system with more than one engine in which any number of the engines could be operating in the described manner.

In order to operate the engine 16, the engine operating conditions, such as engine speed and torque, boost pressure and many other variables, may be sensed in any conventional manner, and the electronic control module 30 will determine the engine load from the sensed conditions. Depending on the determined engine load, the electronic control module 30 will activate the low engine load algorithm, the mid-low engine load algorithm or the high load engine load algorithm. Although the present disclosure is illustrated as including three different engine load ranges L, M and H (FIG. 5), the present disclosure contemplates the entire engine load range being divided into any number of load ranges as long the injection strategies differ between a mid-low range and a high engine load range. Although the low engine load range "L" includes 0–10% load, the mid-low engine load range "M" includes 11–50% engine load and the high engine load range "H" includes 51–100% engine load for engine 16, it should be appreciated that the engine load ranges will vary from engine-to-engine. For instance, an engine without or with few power-enhancing features, such as a turbocharger, may have a mid-low engine load range of 11–30% In all engine systems, the mid-low range is the range of engine load in which the power-demands are relatively low, but particulate emissions are often relatively high.

After determining which engine load range in which the engine 16 is operating, the predetermined total amount of fuel injected into the combustion chambers 17 is apportioned into a least the first amount of fuel and the second amount of fuel. When in the low engine load range "L" the low engine load algorithm preferably apportions the entire, or nearly all of the predetermined total amount of fuel to the first amount of fuel. Because the power demand of the engine 16 is so low in the low engine load range "L", the predetermined total amount of fuel can be injected in the low NOx emissions injection. The injection, which generally occurs around 40°–60° before top dead center in the compression stroke, will be injected in the first spray pattern 52 to avoid contact with the cylinder walls, which can lead among other things to oil dilution. If a conventional fuel injector is used, the low NOx emissions injection will occur around 40° before top dead center. The fuel will mix with the air before combusting at or shortly before top dead center. The relatively homogeneous combustion of the air-fuel mixture results in low NOx emissions. Because the predetermined total amount of fuel needed in the low engine load range 32 is relatively small, the combustion of the low NOx emissions injection does not create a significant pressure spike that could adversely wear on the engine components and does not create an excessive amount of particulate emissions.

When in the mid-low engine load range "M", the mid-low engine load algorithm apportions 15% or less of the predetermined total amount of fuel to the second amount of fuel injected during the second particulate emissions-reducing injection. The apportioning, when in the mid-low engine load range "M", is based, in part, on expected quantities of NOx emissions and particulate emissions. An emissions adjustment algorithm can adjust the NOx emissions and particulate emissions by reapportioning the predetermined total amount of fuel between the first and second amounts of fuel. For instance, the apportioned first fuel amount and second fuel amount that achieves the expected quantities of NOx emissions and particulate emissions can be predetermined for various engine loads within the mid-low engine load range "M". The predetermined amounts can be included within a map recorded on the electronic control module 30. As the engine load changes, the first and second amounts can be reapportioned according to the map. Conventional sensors that can sense the NOx emissions and particulate emissions can also be used to reapportion the predetermined total amount of fuel. If a NOx sensor senses that the NOx emissions is greater than some predetermined NOx emissions level, some of the second amount of fuel can be reapportioned to the first amount of fuel. If a sensor senses that the particulate emissions is greater than some predetermined particulate emissions level, some of the first amount of fuel can be reapportioned to the second amount of fuel. Thus, the second amount of fuel may vary between 10–15% as the engine load and emissions vary within the mid-low engine load range "M". It should be appreciated that any open or closed loop method of setting the apportioned fuel amounts and reapportioning the fuel amounts can be used depending upon the desired sophistication of the overall control system.

Once the apportioned amounts of fuel have been determined, the mid-low engine load algorithm will signal the fuel injectors 20 to inject the first amount of fuel through the first low NOx emissions injection. The first low NOx emissions injection will generally occur relatively early in the engine cycle, such as at 40°–60° before top dead center, and maybe even earlier in the compression stroke. Although the timing of the low NOx emissions injection can vary, it should be sufficiently early that the fuel and air has time to mix before combustion into a semi-homogeneous mixture, but not too early that the combustion efficiency from the injection is diminished due to too thorough mixing. Those skilled in the art will appreciate that combustion efficiency may be defined as the sum of the potential energy of the carbon monoxide (CO) and the hydrocarbon (HC) exhaust components divided by the potential energy of the fuel injected. Thus, the more fuel being injected within the low NOx emissions injection, the earlier the injection might be. Preferably, the low NOx emissions injection will be in the first spray pattern 52 in order to reduce fuel contact with the cylinder walls and the piston 13, thereby reducing the risk of oil dilution. As the piston 13 advances, the fuel and air will mix. At about, or shortly before, top dead center the fuel will combust. Because of the homogeneous combustion, relatively low NOx emissions will be created. However, because the predetermined total amount of fuel is greater in the mid-low engine range "M" than in the low engine load range "L", the low NOx emissions injection 55 can create an undesirable level of particulate, specifically hydrocarbons. The second particulate emissions reducing injection 56 relatively near top dead center of the compression or expansion stroke can raise the temperature of the combustion chamber 17 in order to burn these hydrocarbons. The second injection 56 preferably is in the second pattern with the relatively large average angle with respect to the centerline 40 of the combustion chamber 17. Although the second particulate emissions injection may create some NOx and/or particulate emissions, specifically soot, the amount of NOx and soot created is relatively small being that only 15% or less of the predetermined total amount of fuel is being apportioned to the second amount of fuel. The overall particulate emissions, including hydrocarbons and soot, created by the injection strategy in the mid-low engine load range "M" is reduced by the second particulate emissions reducing injection 56.

Further, the NOx reducing algorithm injects the second particulate emissions injection 56 at least the predetermined amount of time after combustion of the low NOx emissions injection 55. The predetermined amount of time is a sufficient amount of time to cool the combustion chamber 17 from the combustion of the first amount of fuel 55. If the NOx reducing algorithm determines that the NOx emissions being produced exceed the predetermined NOx emissions level, the NOx reducing algorithm can further reduce the NOx by further retarding the second particulate emissions reducing injection 56. Preferably, the particulate emissions reducing injection 56 will occur after top dead center in the expansion stroke.

When in the high engine load range "H", the high engine load algorithm apportions greater than 15% of the predetermined total amount of fuel to the second amount of fuel 56. The apportioning of the predetermined total amount of fuel between the first amount of fuel 55 and the second amount of fuel 56 when in the high engine load range "H" is based, in part, on a quantity of diluents added into the combustion chambers 17. Although the present disclosure contemplates various methods of adding various diluents to the combustion chambers 17, in the illustrated embodiment, diluents are added to the combustion chambers 17 by re-circulating exhaust gas. Although not necessary, the exhaust gas, in the illustrated embodiment, is compressed, via the turbocharger 38, prior to being added to the combustion chamber 17. The addition of the compressed exhaust gas to the combustion chambers 17 decreases the pressure spike caused by the combustion of the first low NOx emissions injection 55 by slowing the combustion rate. Just like the low engine load algorithm and the mid-low engine load algorithm, the high engine load algorithm is operable to signal the fuel injectors 20 to inject the low NOx emissions injection 55 during non-auto ignition conditions, relatively early in the compression stroke of an engine cycle. However, because the predetermined total amount of fuel injected during each engine cycle in the high engine load range "H" is greater than the predetermined total amount of fuel injected during the low engine load range "L" and the mid-low engine load range "M", the first amount of fuel 55 injected in the low NOx emissions injection will generally be greater than the first amount of fuel 55 injected in the low NOx emissions injections of the low "L" and mid-low "M" ranges. The addition of the exhaust gas allows the greater first amount of fuel by lessening the pressure spike caused by the homogeneous combustion of the first amount of fuel 55. The combustion of the first fuel amount 55 creates relatively low NOx emissions.

Even with the addition of the diluents, being the compressed exhaust gas, the amount of fuel that can be injected within the first low NOx emissions injection 55 is limited. Thus, in order to increase power output, the predetermined total amount of fuel is reapportioned by increasing the second amount of fuel 56. The electronic control module 30 can include a map with predetermined first amount of fuel 55 and second amount of fuel 56 for various engine loads. As the desired power output increases, the amount of fuel apportioned to second amount of fuel 56, most often will increase. In the illustrated embodiment, the apportioning of the fuel between the first amount 55 and the second amount 56 is approximately 15%–20% at a low end of the high engine load range "H" and is approximately 50–70% at a high end of the high engine load range "H".

The high engine load algorithm is operable to signal the fuel injectors 20 to inject the second high power-producing injection 56 after at least the predetermined amount of time the combustion of the first low NOx emissions injection, which may be sensed in a conventional manner, such as via a cylinder pressure sensor or the like. The predetermined amount of time is an amount of time to cool the combustion chamber 17 after combustion. Thus, when the second high power-producing injection 56 is injected near, but after, top dead center in auto-ignition conditions, the combustion chamber 17 will be relatively cool, thereby limiting the amount of NOx produced by the second high power-producing injection. Similar to the mid-low engine load algorithm, the high engine load algorithm includes a NOx reducing algorithm operable to signal the fuel injectors 20 to retard the second high power-producing injection 56, if necessary. Although the later the injection, the less NOx generally produced, those skilled in the art will appreciate that the ability to retard is limited by the amount of fuel in the second injection and the willingness to sacrifice power output efficiency.

There may be various circumstances in which it is desirable to inject fuel in the intake or exhaust stroke or relatively late in the expansion stroke. For instance, in order to regenerate certain exhaust after treatment devices, such as a particulate trap, the exhaust must be reductant-rich. The reductant-rich exhaust can be created by injecting the additional amount of fuel during non-auto ignition conditions after the second injection. Thus, the additional amount of fuel will not combust within the combustion chamber. The unburnt fuel with the exhaust can be used to regenerate the particulate trap.

The present disclosure is advantageous because it provides a method of operating the engine system 10 that produces relatively low concentrations of various undesirable emissions while maintaining the desired power output over the entire engine operating range. The present method recognizes that there are different primary operating concerns at different operating ranges. For instance limiting NOx emissions is a goal of the injection strategies at all engine operating ranges. An injection during non-auto ignition conditions, about 40°–60°, before top dead center creates low NOx emissions.

However, the limitation of NOx emissions during the mid-low engine range "M" and the high engine load range "H" must be balanced with other concerns. When the engine is operating in the mid-low engine load range "M", more fuel is being injected into the cylinder 15 than in the low engine load range "L". The low NOx emissions injection 55 will produce more hydrocarbons than the low NOx emissions injection of the low engine load range "L". In order to reduce the amount of hydrocarbon, about 10–15% of the predetermined total amount of fuel is apportioned to the second particulate emissions reducing injection 56. Although the second injection 56 creates soot and some NOx, the overall amount of NOx and particulate emissions are relatively low. When operating in the high engine load range "H", the amount of fuel that can be injected through the low NOx emissions injection 55 cannot produce the desired power output. More than 15% of the predetermined total amount of fuel is apportioned to the second high power-producing injection 56. The more power needed, the more fuel apportioned to the high power-producing injection 56. Thus, the engine system 10 includes algorithms operating at different load ranges "L", "M" and "H", in order to maintain low emissions and the desired power output.

The present disclosure is also advantageous because it provides methods of further reducing undesirable emissions, such as NOx. It has been found that by retarding the second injection 56 NOx emissions can be reduced. The second injection 56 preferably occurs after the combustion chamber 17 has cooled from the combustion of the first NOx emissions injection 55, but while the combustion chamber 17 is in auto ignition conditions. The heat from the combustion of the first low NOx emissions injection 55 extends auto-ignition conditions, allowing the second injection 56 to occur later than it could occur without the first injection 55. Thus, the mid-low engine algorithm and the high engine load algorithm can retard the second injection 56, respectively, without the risk of misfire.

The addition of diluents, being cooled compressed exhaust gases in the illustrated embodiment, can also aid in the reduction of NOx emissions. By adding the exhaust gas to the combustion chamber 17, the pressure spike and high temperatures caused by the homogeneous or semi-homogeneous combustion of the first low NOx emissions injection 55 can be suppressed. With the reduced pressure spike and temperatures, more fuel can be injected through the first low NOx emissions injection 55, thereby reducing the overall NOx emissions from the combustion chamber 17. Further, it has been found that the combustion of the second injection 56 with the addition of the diluents creates less NOx than the combustion of the second injection 56 without diluents.

Moreover, the use of the mixed-mode fuel injector 20 expands options in the control over injection strategies, which in return, can lead to a reduction in emissions, better engine performance and a reduction in costs. For instance, unburnt fuel can be added to the exhaust by injecting through the mixed-mode injector late in the expansion stroke rather than requiring an additional fuel injector within the exhaust passage. The mixed-mode fuel injectors 20 can inject fuel early or late in the engine cycle, when the piston 13 is relatively far from top dead center, without spraying fuel in the conventional spray pattern that results in wetting of the cylinder walls. Because there is no spraying of the cylinder walls, the risk of oil dilution and the mechanical problems associated from oil dilution are greatly reduced.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A method of operating an engine system comprising the steps of:
  apportioning a predetermined total amount of fuel injected into at least one combustion chamber into at least a first amount of fuel and a second amount of fuel;
  injecting the first amount of fuel into the at least one combustion chamber during non-auto ignition conditions;
  when the engine system is in a mid-low engine load range, injecting the second amount of fuel, being one of equal to or less than 15% of the predetermined total amount of fuel, into the at least one combustion chamber during auto-ignition conditions; and
  when the engine system is in a high engine load range, injecting the second amount of fuel, being greater than 15% of the predetermined total amount of fuel, in the at least one combustion chamber during auto-ignition conditions.

2. The method of claim 1 wherein the step of injecting fuel into the at least one combustion chamber during non-auto ignition conditions includes a step of injecting the fuel in a first spray pattern with a relatively small average angle with respect to a centerline of the at least one combustion chamber; and
  the steps of injecting fuel during auto-ignition conditions include a step of injecting the fuel in a second spray pattern with a relatively large average angle with respect to the centerline of the at least one combustion chamber.

3. The method of claim 1 wherein the step of apportioning of the predetermined total amount of fuel between the first fuel amount and second fuel amount when in the high engine load range being based, in part, on a quantity of diluents added into the combustion chamber.

4. The method of claim 3 including a step of adding the diluents to the at least one combustion chamber, at least in part, by re-circulating exhaust gas.

5. The method of claim 2 including a step of injecting an additional amount of fuel in the first spray pattern during non-auto ignition condition before injecting the first amount of fuel.

6. The method of claim 1 including a step of reducing NOx emissions, at least in part, by injecting the second amount of fuel at least a predetermined amount of time after combustion of the first amount of fuel.

7. The method of claim 6 wherein the step of reducing NOx includes a step of retarding a timing of the injection of the second amount of fuel.

8. The method of claim 6 wherein injecting the second amount of fuel occurs after top dead center of the compression stroke.

9. The method of claim 1 including a step of increasing power output, at least in part, by reapportioning the predetermined total amount of fuel by increasing the second amount of fuel.

10. The method of claim 1 wherein the step of apportioning, when in the mid-low engine load range, being based, in part, on expected quantities of NOx emissions and particulate emissions.

11. The method of claim 10 including a step of adjusting at least one of NOx emissions and particulate emissions, at least in part, by reapportioning the first amount of fuel and the second amount of fuel.

12. The method of claim 1 wherein the mid-low engine load range includes 10–50% engine load, and the high engine load range includes 51–100% engine load.

13. The method of claim 1 including a step of apportioning an entire predetermined total amount of fuel to the first amount of fuel when the engine system is in a low engine load range.

14. An engine system comprising:
  at least one combustion chamber including a piston operable to reciprocate within the combustion chamber;
  a fuel injector operable to inject fuel into the at least one combustion chamber;
  an electronic control module in communication with the fuel injector and including a mid-low engine load algorithm and a high engine load algorithm; and
  the mid-low engine load algorithm being operable to signal the fuel injector to inject a predetermined total amount of fuel divided between a first low NOx emissions injection during non-auto ignition conditions and a second particulate emissions reducing injection, being one of less than or equal to 15% of the predetermined total amount of fuel, and the high engine load algorithm operable to signal the fuel injector to inject the predetermined total amount of fuel divided between a first low NOx emissions injection during non-auto ignition conditions, and a second high power-producing injection, being greater than 15% of the predetermined total amount of fuel, during auto-ignition conditions.

15. The engine system of claim 14 wherein the fuel injector includes a mixed-mode fuel injector operable to inject fuel into the at least one combustion chamber in a first spray pattern with a small average angle relative to a centerline of the at least one combustion chamber and a second spray pattern with a large average angle relative to the centerline of the at least one combustion chamber.

16. The engine system of claim 14 wherein the mid-low engine load algorithm being operable within 11–50% engine load.

17. The engine system of claim 14 wherein the mid-low engine load algorithm being operable to signal the fuel injector to inject the particulate emissions reducing injection at least a predetermined amount of time after combustion of the low NOx emissions injection; and the high engine load algorithm being operable to signal the fuel injector to inject the high power-producing injection at least the predetermined amount of time after combustion of the low NOx emissions injection.

18. The engine system of claim 14 wherein the mid-low engine load algorithm includes an emissions adjustment algorithm being operable to adjust at least one of NOx emissions and particulate emissions, at least in part, by reapportioning the predetermined total amount of fuel between the low NOx emissions injection and the particulate emissions-reducing injection.

19. The engine system of claim 14 wherein the mid-low engine load algorithm includes a NOx reducing algorithm operable to reduce NOx emissions from the at least one combustion chamber by retarding a timing of the particulate emissions reducing injection; and the high engine load algorithm includes a NOx reducing algorithm operable to reduce NOx emissions from the combustion chamber by retarding a timing of the high power-producing injection.

* * * * *